United States Patent
Radunovic et al.

(10) Patent No.: US 8,031,744 B2
(45) Date of Patent: Oct. 4, 2011

(54) FULL-DUPLEX WIRELESS COMMUNICATIONS

(75) Inventors: Bozidar Radunovic, Cambridge (GB); Nikhil Singh, Urbana, IL (US); Dinan Srilal Gunawardena, Cambridge (GB); Alexandre Proutiere, Cambridge (GB); Peter Bernard Key, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 100 days.

(21) Appl. No.: 12/404,494

(22) Filed: Mar. 16, 2009

(65) Prior Publication Data

US 2010/0232324 A1    Sep. 16, 2010

(51) Int. Cl.
    H04J 1/00    (2006.01)
(52) U.S. Cl. ........................................................ 370/486
(58) Field of Classification Search ................ 370/386; 375/E7.022
    See application file for complete search history.

(56) References Cited

U.S. PATENT DOCUMENTS

| | | | |
|---|---|---|---|
| 6,992,641 B1 | 1/2006 | Sanelli | |
| 7,366,244 B2 | 4/2008 | Gebara et al. | |
| 7,440,410 B2 * | 10/2008 | Ojard et al. | 370/252 |
| 7,583,594 B2 * | 9/2009 | Zakrzewski | 370/229 |
| 7,769,867 B2 * | 8/2010 | Fukuda | 709/227 |
| 2003/0104787 A1 | 6/2003 | Blount et al. | |
| 2004/0142700 A1 | 7/2004 | Marinier | |
| 2006/0142033 A1 | 6/2006 | Wolman et al. | |
| 2008/0089397 A1 | 4/2008 | Vetter et al. | |
| 2008/0107046 A1 | 5/2008 | Kangasmaa et al. | |
| 2008/0219389 A1 | 9/2008 | Nisbet | |

OTHER PUBLICATIONS

Andrews, "Interference Cancellation for Cellular Systems: a Contemporary Overview". Wireless Communications, IEEE, vol. 12 No. 2, Apr. 2005, pp. 19-pp. 29.
Gollakota et al., "Zigzag Decoding: Combating Hidden Terminals in Wireless Networks". In SIGCOMM '08: Proceedings of the ACM SIGCOMM 2008 Conference on Data Communication, 2008. ACM, pp. 159-pp. 170.
Halperin et al., "Taking the Sting out of Carrier Sense: Interference Cancellation for Wireless LANS". In MobiCom '08: Proceedings of the 14th ACM International Conference on Mobile Computing and Networking, 2008, ACM, pp. 339-pp. 350.
Hamkins et al., "Autonomous Software-Defined Radio Receivers for Deep Space Applications", Wiley, 2006, pp. 227-pp. 270.
Halperin, et al., "Interference Cancelleation: Better Receivers for a New Wireless MAC", retrieved on Jan. 2, 2009 at <<http://www.cs.washington.edu/homes/dhalperi/pubs/Halperin_interference_cancellation.pdf>>, pp. 1-6.

(Continued)

*Primary Examiner* — Ricky Ngo
*Assistant Examiner* — Chandrahas Patel
(74) *Attorney, Agent, or Firm* — Lee & Hayes, PLLC

(57) ABSTRACT

Full-duplex wireless communication is described. In an embodiment, a transceiver device having a transmitter circuit and a receiver circuit receives a data packet sent over a shared communication medium. In the embodiment, the transceiver reads the header of the data packet and starts transmitting an output signal on the same shared communication medium. Embodiments are described in which, whilst the transmission of the output signal is ongoing, the transceiver receives an impaired data signal which is made up of the payload of the data packet and interference from the output signal. In the embodiment, a cancellation signal is derived from the output signal, and this is combined with the impaired data signal to remove the interference and recover the payload of the data packet.

16 Claims, 12 Drawing Sheets

OTHER PUBLICATIONS

Laskar, et al., "An Active Integrated Circuit Wireless Interference Cancellation Solution", retrieved on Jan. 2, 2009 at <<http://users.ece.gatech.edu/~etentze/RWS_2006_Wireless_Canceller.pdf>>, pp. 1-4.

Ranasinghe, et al., "Distributed contention-free traffic scheduling in IEEE 802.11 multimedia networks", retrieved on Jan. 2, 2009 at <<http://ieeexplore.ieee.org/stamp/stamp.jsp?arnumber=939953&isnumber=20343>>, IEEE 2001, pp. 18-28.

Seskar, et al., "Software Defined Radio Architectures for Interference Cancellation in DS-CDMA Systems", retrieved on Jan. 2, 2009 at <<http://citeseerx.ist.psu.edu/viewdoc/download;jsessionid=E545E24C4EBE7ED59FF5DFB67B057C4C?doi=10.1.1.30.4482&rep=rep1&type=pdf>>, Wireless Information Network Laboratory (WINLAB), Rutgers University, New Jersey, pp. 1-22.

Shono, et al., "IEEE 802.11 Wireless LAN Implemented on Software Defined Radio With Hybrid Programmable Architecture", retrieved on Jan. 2, 2009 at <<http://ieeexplore.ieee.org/stamp/stamp.jsp?arnumber=01532215>>, IEEE Transactions on Wireless Communications, vol. 4, No. 5, Sep. 2005, pp. 2299-2308.

You, et al., "Channel Estimation Method with Interference Reduction for High-Rate Personal Area Networks", retrieved on Jan. 2, 2009 at <<http://ieeexplore.ieee.org/stamp/stamp.jsp?arnumber=920932&isnumber=19919>>, Electronics Letters, vol. 37, No. 9, Apr. 26, 2001, pp. 588-590.

Haas, et al., "Dual Busy Tone Multiple Access (DBTMA)—A Multiple Access Control Scheme for Ad Hoc Networks", IEEE Transactions on Communications, vol. 50. No. 6, Jun. 2002, 11 pages.

Radunovic, et al., "Efficiency and Fairness in Distributed Wireless Networks Through Self-interference Cancellation and Scheduling", Microsoft Research Technical Report, MSR-TR-2009-27, Mar. 12, 2009, 13 pages.

\* cited by examiner

FULL-DUPLEX WIRELESS COMMUNICATIONS

BACKGROUND

A shared communication medium is used in many communication networks to enable the exchange of data between nodes. In order for the nodes to make reliable and predictable use of the shared medium, they utilize a multiple access technique and obey a set of medium access control (MAC) rules, which govern how the medium is accessed and shared.

One multiple access technique used to access a shared medium in a communication network is carrier sense multiple access (CSMA). CSMA is used in both wired networks such as IEEE 802.3 and wireless networks such as IEEE 802.11. A node operating in a CSMA system attempts to avoid transmission collisions with other users of the shared medium by listening for the presence of a carrier (i.e. a transmission) on the shared medium before sending any data. Therefore, a node does not transmit on the shared medium when other nodes are using it.

In a wired CSMA network, a transmitted signal can be sensed almost simultaneously by all of the nodes sharing the communication medium. Therefore, if a collision does occur (e.g. due to two nodes starting transmission at the same time), then this can be detected by the transmitters and they can back-off from re-transmission for a random period of time according to the MAC protocol. This is known as CSMA with collision detection (CSMA/CD).

However, for wireless networks, this is not the case due to the limited propagation range of the radio signals. For example, consider three wireless nodes A, B, and C. Node A is in propagation range of node B but not node C, and similarly node C is in propagation range of node B, but not node A. As node A and node C are not within range of each other, they are unable to sense signals that the other is transmitting. When node A wishes to transmit to node B it listens on the shared communication medium (the radio frequency in question) to determine if the carrier is free (in accordance with the CSMA protocol). If no other transmissions are detected, then the transmission from node A to node B is started. Subsequently, if node C wishes to transmit to node B, it also listens on the carrier to sense for transmissions. Node C does not detect the transmission from node A, as it is out of its range. Therefore, node C starts transmitting to node B as well. As node B is in range of both of nodes A and C, these two transmissions interfere, and hence a collision occurs.

The problem of wireless nodes suffering from interference and collisions due to not being able to detect other users of the medium because the other user is too far away is known as the "hidden node problem".

To reduce this problem, previous wireless communication protocols such as IEEE 802.11 have used a technique called CSMA with collision avoidance (CSMA/CA). CSMA/CA is used to reduce the likelihood of collisions due to several wireless nodes attempting to transmit immediately following the carrier becoming free after a transmission. If the channel is sensed as busy by a node wanting to transmit data then the transmission is deferred for a random interval after the carrier becomes idle. Whilst this can reduce the probability of collisions on the carrier, it cannot completely eliminate collisions caused by the hidden node problem. An example of a CSMA/CA scheme is the distributed coordination function (DCF) used in IEEE 802.11 wireless networks.

CSMA/CA can further be supplemented by the exchange of request to send (RTS) and clear to send (CTS) packets to alert nearby nodes to the impending transmission of a frame. For example, a node initiates a data sending process by sending an RTS message. A destination node replies with a CTS message. Any other node receiving the RTS or CTS frame is arranged not to send data for a time which is specified in the RTS and CTS frames. This therefore reduces the frequency of frame collisions. However, using the RTS/CTS process introduces a significant overhead in terms of delay and extra message passing, which consequently reduces throughput. As a result, the RTS/CTS mechanism is often switched off in applications using IEEE 802.11 protocols.

A further problem called the "exposed node problem" also exists in CSMA wireless networks. In this case, consider four nodes A, B, C and D. Node B is in range of node A and C only, and node C is in range of node B and D only. If node B is transmitting to node A, then node C senses the carrier, hears the transmission from node B and determines that it is not able to transmit to node D. However, this is an incorrect conclusion, as a transmission to node D would only cause interference in the region between node B and C, where no nodes are receiving data. The exposed node problem therefore reduces the spatial reuse of the shared medium, thereby reducing the overall performance of the network.

The embodiments described herein are not limited to implementations which solve any or all of the noted disadvantages.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Full-duplex wireless communication is described. In an embodiment, a transceiver device having a transmitter circuit and a receiver circuit receives a data packet sent over a shared communication medium. In the embodiment, the transceiver reads the header of the data packet and starts transmitting an output signal on the same shared communication medium. Embodiments are described in which, whilst the transmission of the output signal is ongoing, the transceiver receives an impaired data signal which is made up of the payload of the data packet and interference from the output signal. In the embodiment, a cancellation signal is derived from the output signal, and this is combined with the impaired data signal to remove the interference and recover the payload of the data packet.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples. Although the present examples are described and illustrated herein as being implemented in a CSMA system, the system described is provided as an example and not a limitation. As those skilled in the art will appreciate, the present examples are suitable for application in a variety of different types of multiple access systems. This includes any wireless network whose control mechanisms are distributed, such as wireless local area networks (WLAN) (e.g. IEEE 802.11), wireless personal area networks (WPAN) (e.g. IEEE 802.15, Bluetooth, and ZigBee), ad-hoc networks and mesh networks, and other electromagnetic access control mechanisms such as HomePlug and HomePNA.

Figure 1:
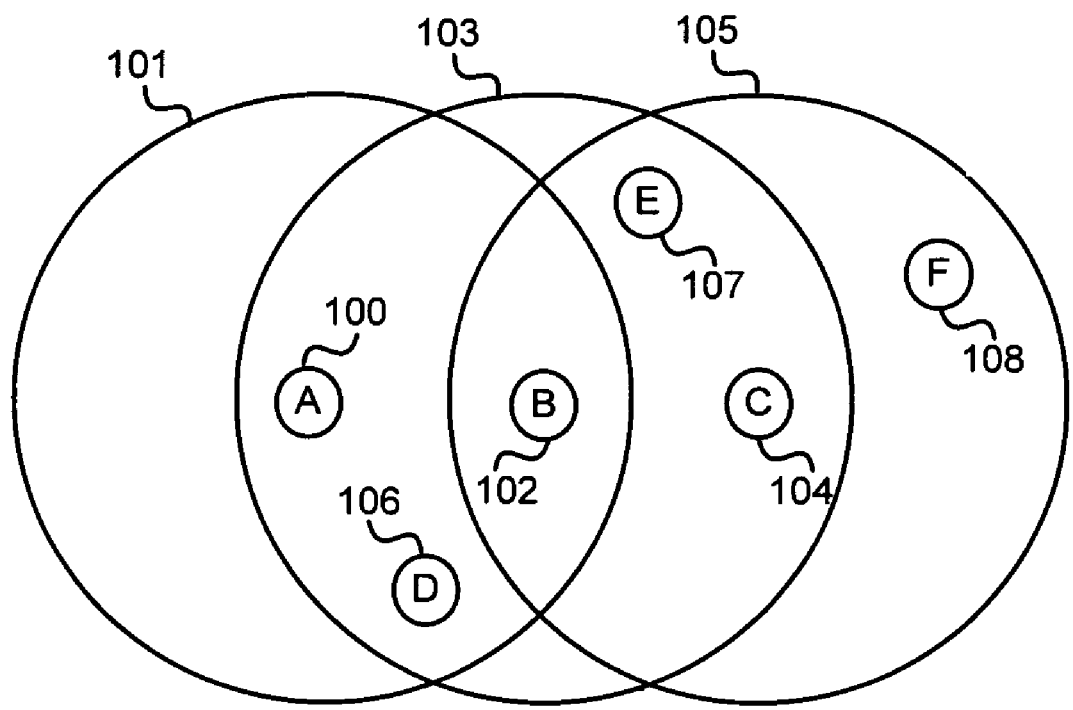
FIG. 1 is an illustrative decentralized wireless network having a shared communication medium.

FIG. 1 shows an illustrative network topology which is used to describe the operation of a technique to mitigate interference effects in a decentralized wireless network having a shared communication medium. Six nodes are illustrated in FIG. 1. The nodes in FIG. 1 can be made up of access points, mobile terminals, personal computers, or other devices capable of operating in accordance with the network access protocols.

Node A 100 has a range 101 in which it can receive signals from other nodes, and in which it can transmit signals to other nodes. Similarly, node B 102 has a transmit and receive range 103. Furthermore, node C 104 has a transmit and receive range 105. Node B 102 is within the range of both nodes A 100 and C 104, but nodes A 100 and C 104 are not within range of each other. Nodes D 106, E 107 and F 108 have similar transmit and receive ranges (not shown in FIG. 1).

As node B 102 is in range of both node A 100 and node C 104, the hidden node problem can occur, as node C 104 cannot detect whether node A 100 is sending a transmission to node B 102. Therefore, node C 104 can start transmitting to node B 102 at the same time as node A 100 is transmitting to node B 102, and cause interference.

Furthermore, the exposed node problem also exists in this example scenario. For example, if node B 102 is transmitting to node A 100 or D 105, then node C 104 detects the transmission and (incorrectly) assumes that it is unable to transmit any data. However, if node C 104 were to send data to node F 108, then this would not be affected by the transmission of node B 102, as node F 108 is out of range of node B 102.

In order to reduce the effect of interference without impacting the throughput of the network a technique based on full-duplex communication in a single band with self-interference cancellation is used. A full-duplex communication system enables at least some nodes to communicate in both directions (i.e. transmit and receive), at the same time.

In-going and out-going links from a node usually interfere, hence for simultaneous transmissions and reception at a node orthogonal channels are used. Wireless communications systems have often provided full-duplex capability by using "frequency-division duplexing" whereby the communication entities transmit using one carrier frequency and receive on a different carrier frequency. This results in the use of more than one communications frequency band or channel and is not possible where only one frequency band is available. Transmit and receive signals can also be separated by codes in a direct sequence spread spectrum (DSS) system to obtain full duplex communication. In other cases full-duplex capability is provided by using time-division duplexing. Here time is used to separate outward and return signals, but this precludes true simultaneous transmission and reception.

Self-interference cancellation enables a node to both transmit and receive on the same channel substantially simultaneously. To receive a packet while transmitting, the node uses knowledge of the signal being transmitted to estimate the interference, and then uses this information to decode the received signal. Self-interference cancellation can be performed effectively and without requiring complex computation because the transmitter and receiver are co-located at the node, and hence can readily exchange information locally.

Figure 2:
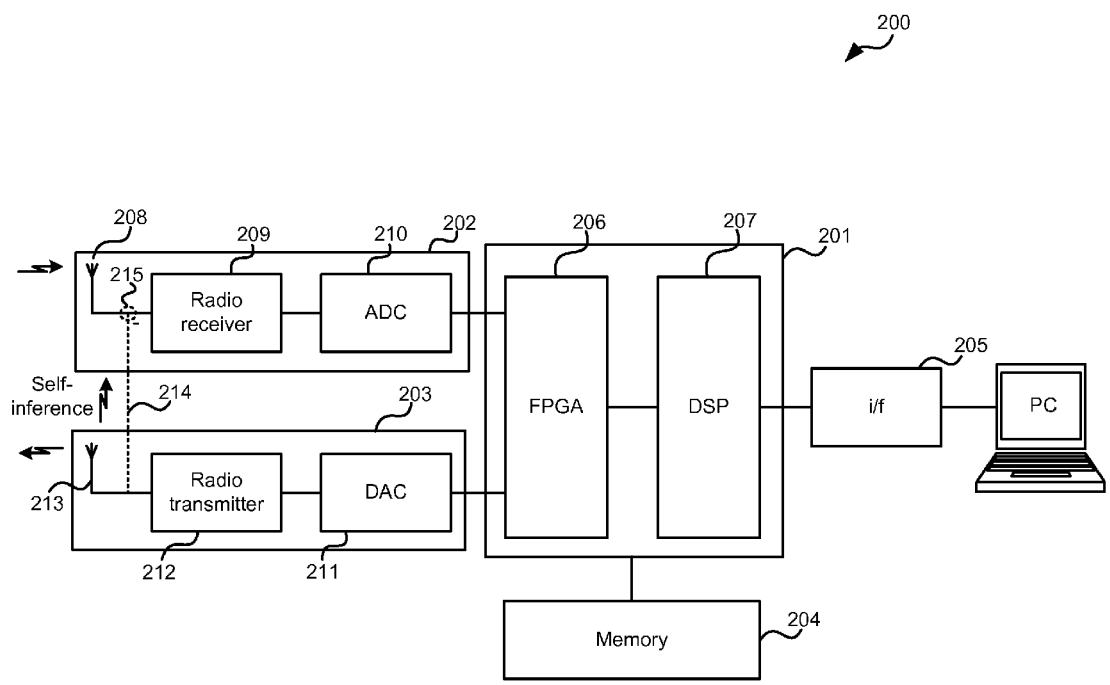
FIG. 2 is a schematic diagram of an apparatus for full-duplex wireless communication.

FIG. 2 shows a transceiver 200 for use in a single band full-duplex communication system. The transceiver comprises a processor 201 connected to a receive path 202 and a transmit path 203. A memory 204 storing software instructions for controlling the transceiver is connected to the processor 201. The processor 201 is further connected to an interface 205 for connecting the transceiver to a personal computer or mobile device.

In one example, the processor comprises a field programmable gate array (FPGA) 206 arranged to perform the self-interference cancellation and other functions such as modulation/demodulation and coding/decoding, and a digital signal processor (DSP) 207 arranged to implement the MAC protocol and perform functions such as framing the data packets. In other examples, a single general-purpose processor can be used.

The receive path 202 comprises a receive antenna 208 which is connected to a radio receiver circuit 209. The radio receiver circuit 209 is arranged to amplify, filter and frequency scale the radio signals received at the receive antenna 208. The radio receiver 209 outputs signals to an analog to digital converter (ADC) 208, which converts the analog signals from the radio receiver 209 into digital signals suitable for input to the processor 201.

The transmit path 203 comprises a digital to analog converter (DAC) 211 for converting digital signals from the processor 201 into analog signals. The output of the DAC is connected to a transmitter circuit, which is arranged to amplify, frequency scale and filter the analog signals such that can be transmitted from a transmit antenna 213 connected to the transmitter circuit 212.

As stated, the transceiver 200 is arranged to operate in a single-band full duplex communication system by implementing self-interference cancellation. The self-interference cancellation can by implemented in a number of ways.

As a first example, the processor 201 can have prior knowledge of the time delay experienced by a signal being transmitted from the transmit path 203 and being received as interference at the receive path 202. As the data being transmitted is known to the processor 201 in advance of its transmission, the processor 201 can generate a cancellation signal as a function of the transmitted signal (e.g. the inverse of the transmitted signal and/or taking into account multipath reflections), apply the appropriate delay and combine this with the received signal input to the processor 201 by the ADC 210 to remove the interference. This technique is computationally inexpensive and effective. It is especially useful where the channel conditions are relatively constant such that the delay remains constant and effects such as multipath interference are not significant.

As a second example, the transmitted signal itself can be used to cancel the interference from the signal received at the transceiver 200. This can be achieved by providing the transmitted signal to the receive path 202 via two routes. Firstly, the signal transmitted from the transmit antenna 213 is received at the receive antenna 208 (as interference). Secondly, a wired connection 214 (shown dashed in FIG. 1), such as a coaxial cable, provides the transmitted signal to the receive path 202. The signal from the wired connection 214 can be subtracted from the signal from the receive antenna 208 using an analog subtractor 215 to remove the interference. This technique removes the interference before any non-linearities from the receiver circuit 209 are introduced. It also removes all non-linearities of the transmitter circuit 203 as these non-linearities are present in the wired connection 214 as well as in the signal transmitted from the transmit antenna 213.

In a third example, the transmitted signal can again be sent via two routes. Firstly, the signal transmitted from the transmit antenna 213 is received at the receive antenna 208 (as interference). Secondly, a wired connection (not shown in FIG. 1), such as a coaxial cable, can provide the transmitted signal to a second receive circuit and second ADC (not shown in FIG. 1) which are identical to the receive circuit 209 and ADC 210 in the receive path 202. The second receive circuit and second ADC provide the transmitted signal from the wired connection to the processor 201, which can use this to generate a cancellation signal and combine the cancellation signal with the received signal from the receive path 202 and thus remove the interference. Because the second receive circuit and second ADC have very similar non-linearities to the receive circuit 209 and ADC 210 in the receive path 202, these are taken into account in the interference cancellation process.

In order to utilize the full-duplex, single-band wireless communications a medium access control (MAC) protocol is provided to control access to the shared medium and manage interference. The MAC protocol layer is a sub-layer of the data link layer specified in the 7 layer OSI model. This sub-layer provides an interface between the logical link control sub-layer and the network's physical layer. Examples of suitable MAC protocols for use with full-duplex, single-band wireless communication systems are described herein.

Full-duplex transceivers, as described above, can be used to solve the hidden node problem by implementing a MAC protocol that ensures that the recipient of a packet begins transmitting a signal in parallel with receiving the packet, which is made possible due to self-interference cancellation. Similarly, the transmitter of the packet uses self-interference cancellation to sense the signal sent by the recipient whilst transmitting the packet.

Because the receiver sends a signal while receiving, it prevents any other interfering node using CSMA in its neighborhood from starting transmitting, ensuring that collisions do not occur and the packet is received successfully. This therefore has the same effect as an RTS/CTS procedure without incurring any delay or overhead. Furthermore, because the recipient is able to send useful data while receiving, successful transmissions on two links that would interfere without interference cancellation are made possible. In such cases, the throughput is increased, and can be doubled in certain circumstances. In addition, there are security benefits to this arrangement. Because a signal is being transmitted while receiving, this acts like noise to a potential eavesdropper. The eavesdropper does not know the transmitted signal, so cannot perform the interference cancellation. This makes the transmissions more secure. The detailed operation of the MAC protocol to implement this is outlined below.

Figure 3:
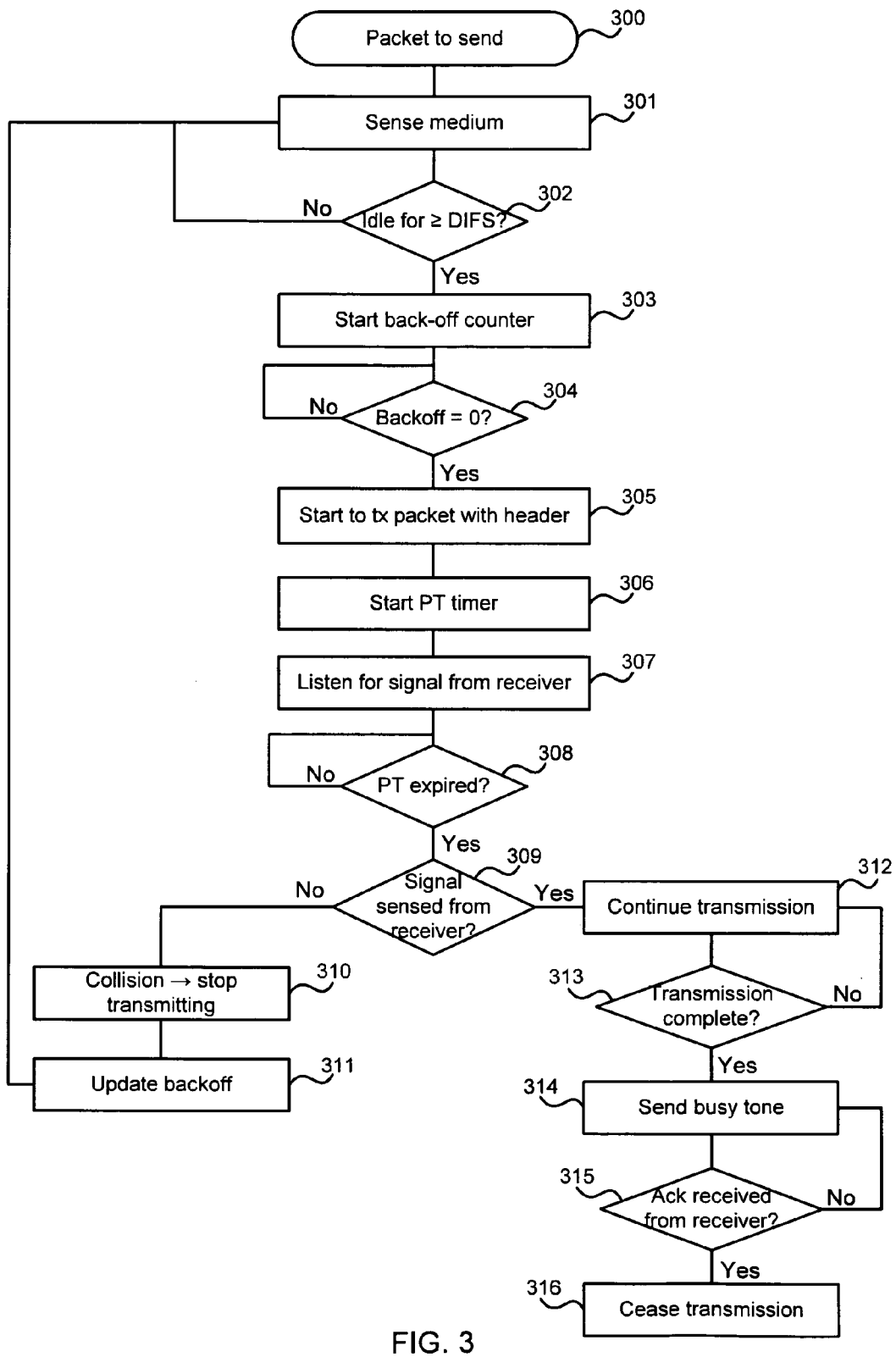
FIG. 3 is a flow diagram of a method for transmitting data in a full-duplex wireless network.

Reference is made to FIG. 3, which illustrates a flow diagram of a MAC protocol used when transmitting data in a full-duplex single-band wireless network. This is illustrated with reference to the network in FIG. 1. In this example, node A 100 in FIG. 1 is sending a data packet to node B 102. The flowchart in FIG. 3 is therefore illustrated as being performed by node A 100 in FIG. 1. A node performing the method shown in the flowchart of FIG. 3 is known as a "primary transmitter".

When node A 100 has a packet to send 300 to node B 102, it firstly senses 301 the medium to determine whether it is currently idle (i.e. not being used for a transmission within the receiver range of node A 100). If it is determined 302 that the medium has been idle for at least a predefined period, known as the distributed interframe space (DIFS), then a back-off counter is started 303. Otherwise, the node returns to sensing 301 the medium.

The back-off counter is a random number of transmission time slots calculated using a parameter called the contention window (CW), which is a transmit window defining a time interval during which transmission can be started. Example algorithms for calculating the back-off counter are described in more detail hereinafter. After selecting the random back-off counter value, the node counts down the number of time slots until the back-off counter reaches zero 304.

When the back-off counter reaches zero, node A 100 starts transmitting 305 the data packet to the recipient (node B 102 in this example). The first part of the data packet transmitted is a packet header, which comprises the identity of the node sending the packet, its capabilities (such as whether it can support full-duplex communication), and information regarding the data packet to follow (such as its length).

When the node starts transmitting the packet header, it also starts a timer 306 known as a primary timer (PT).

Concurrently with the transmission of the data packet, the node listens 309 on the medium for a signal sent from the recipient (node B 102). This is possible due to the full-duplex capabilities of the node, and particularly the self-interference cancellation. The self-interference cancellation can be implemented using any of the ways outlined above. Regardless of the precise technique used for self-interference cancellation, the result is that a cancellation signal is used to remove the self-interference and leave a residual signal. The node processes the residual signal to determine whether it comprises a signal from the recipient node.

The listening on the medium continues until the primary timer expires 308. When the primary timer has expired 309, if a signal from the recipient has not been heard, then the node determines that a collision has occurred and ceases transmission 310. The back-off counter is then updated 311 in accordance with techniques described hereinafter, and the node returns to sensing the medium 301 before attempting re-transmission.

If a signal from the recipient node is heard on the medium, then the transmitting node determines that a collision has not occurred, and continues transmission 312 of the data packet. The signal heard from the recipient can be in the form of another data packet (intended for the transmitting node or another node) or a predefined symbol sequence called a busy tone, as outlined in more detail with reference to FIG. 4 hereinafter.

Transmission of the data packet continues until it is complete 313. Once the transmission of the data packet is complete, the transmitting node then transmits a busy tone 314. The busy tone is a predefined sequence of symbols which is used to broadcast to other nearby nodes that the medium is in use (other than by transmitting data). In one example, the busy tone comprises a sequence of zeroes, which results in an unmodulated carrier being sent from the transmitter circuit of the transmitting node.

The busy tone is sent until an acknowledgement message (ACK) is received 315 from the recipient node (node B 102). When the ACK is received, the transmitting node can determine that the data packet has been received successfully, and ceases the transmission of the busy tone, thereby freeing the medium for use by other nodes.

Figure 4:
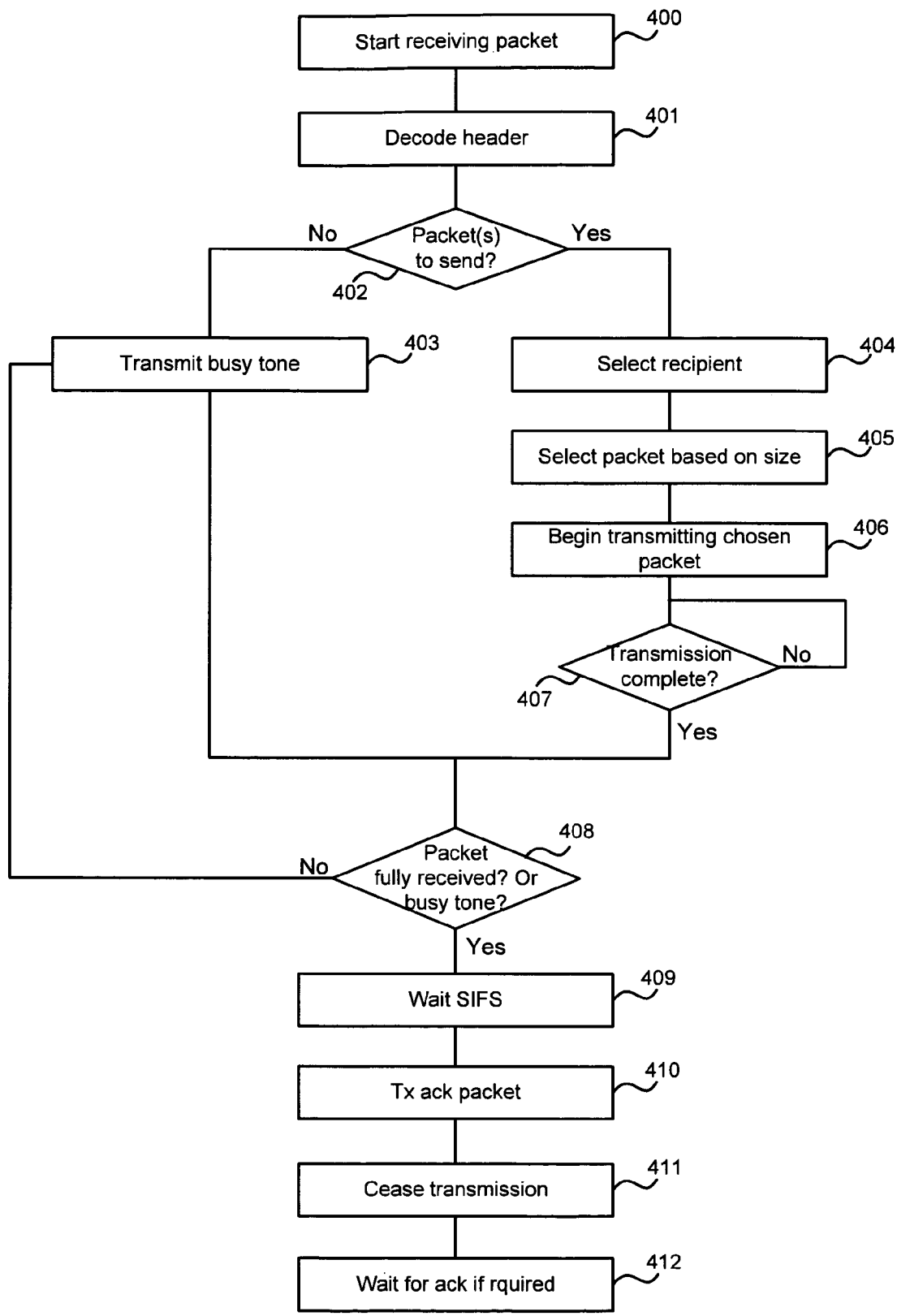
FIG. 4 is a flow diagram of a method for receiving data in a full-duplex wireless network.

Reference is now made to FIG. 4, which illustrates a flowchart of the MAC protocol used when receiving data from a primary transmitter in a full-duplex, single-band wireless network. With reference to the network in FIG. 1, node B 102 is receiving a packet sent from node A 100 (i.e. the opposite side of the transmission described with reference to FIG. 3). A node performing the method shown in the flowchart of FIG. 4 is known as a "primary receiver".

Node B 102 starts receiving 400 a packet sent from node A 100 on the shared medium, and the first portion of the packet received is a packet header. Node B 102 begins decoding 401 the packet header as it is received, and processes the information within it. The packet header comprises information such as the identity of the sender (i.e. node A 100), whether the packet is a primary transmission (i.e. sent from a full-duplex capable transceiver, as is the case in this example) and the length of the packet that is being received.

The node then determines 402 whether it has packets ready to send. If it does not have any packets waiting to be sent, then the node transmits 403 a busy tone, for example comprising a sequence of zeroes which results in an unmodulated carrier.

If the node does have packets waiting to be sent, then it selects 404 a recipient node from the recipients of the waiting packets. The process used for selecting the recipient is described in more detail with reference to FIG. 11 below. From the packets waiting to be sent to the chosen recipient, a packet is selected 405 for transmission based on its size. For example, a packet is selected which is not longer than the packet being received from node A 100 (the length of the packet from node A 100 was included in the packet header). If there are only packets that are longer than the packet being received from node A 100, then either a different recipient node is selected or a busy tone can be sent, as described above.

By selecting a packet for transmission based on its size, packets can be transmitted in an order that is different to the order that they are queued for transmission. The packets are sequence numbered using a monotonically increasing sequence number in accordance with the order in which they were originally queued for transmission, such that the recipient is able re-order the packets.

Once the packet is selected, node B 102 starts transmitting 406 the packet to the chosen recipient. At this point the primary receiver (node B 102) also becomes what is known as a "secondary transmitter". Note that the recipient can be any node within range (e.g. node C, D or E in FIG. 1), including the primary transmitter currently sending the packet (i.e. node A). Also note that the transmission 406 of the packet is occurring concurrently with receiving the packet sent from the primary transmitter, which is made possible due to the self-interference cancellation.

The transmission of the packet to the chosen recipient continues until it is complete 407. Once the transmission of the packet to the chosen recipient is completed, it is determined 408 whether the packet being received from the primary transmitter (node A 100) has been fully received. If this is not the case, then node B 102 continues transmitting, but sends a busy tone 403 rather than data. When the packet from the primary transmitter (node A 100) has been fully received, the node waits 409 for an interval called the short interframe space (SIFS) and then transmits 410 an acknowledgement packet to the primary transmitter to acknowledge that the packet sent from the primary transmitter has been received successfully.

The node then ceases transmission 411, and, if a packet was sent as a secondary transmission by the node, an acknowledgement is awaited 412 from the selected recipient.

Figure 5:
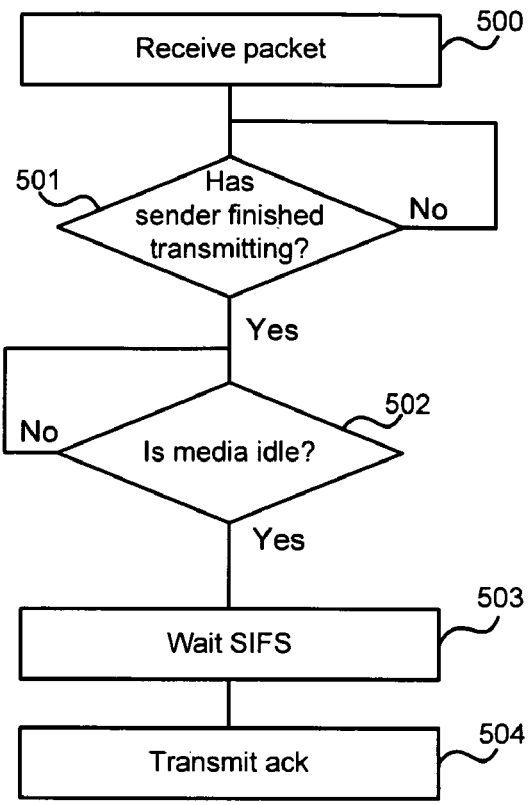
FIG. 5 is a flow diagram of a method for receiving a secondary transmission in a full-duplex wireless network.

Reference is now made to FIG. 5, which illustrates a flowchart of the MAC protocol used when receiving data from a secondary transmitter in a full-duplex, single-band wireless network. With reference to the network in FIG. 1, this is illustrated using an example in which node B 102 became a secondary transmitter (as described above) and selected node C 104 to be the recipient of the secondary transmission. A node performing the method shown in the flowchart of FIG. 5 is known as a "secondary receiver".

The secondary receiver (e.g. node C 104) receives 500 a packet sent by the secondary transmitter (node B 102). Once the packet has been fully sent 501, the secondary receiver senses 502 whether the medium is idle. Once the medium is idle, the secondary receiver waits 503 for the short interframe space and then sends 504 an acknowledgement packet to the secondary transmitter.

Reference is now made to FIGS. 6-9, which illustrate the combined operation of the above described flowcharts in terms of the sequence of messages sent by the nodes. As above, this is illustrated in the example scenario from FIG. 1 with node A 100 as the primary transmitter, node B 102 as the primary receiver/secondary transmitter, and node C 104 as the secondary receiver.

Figure 6:
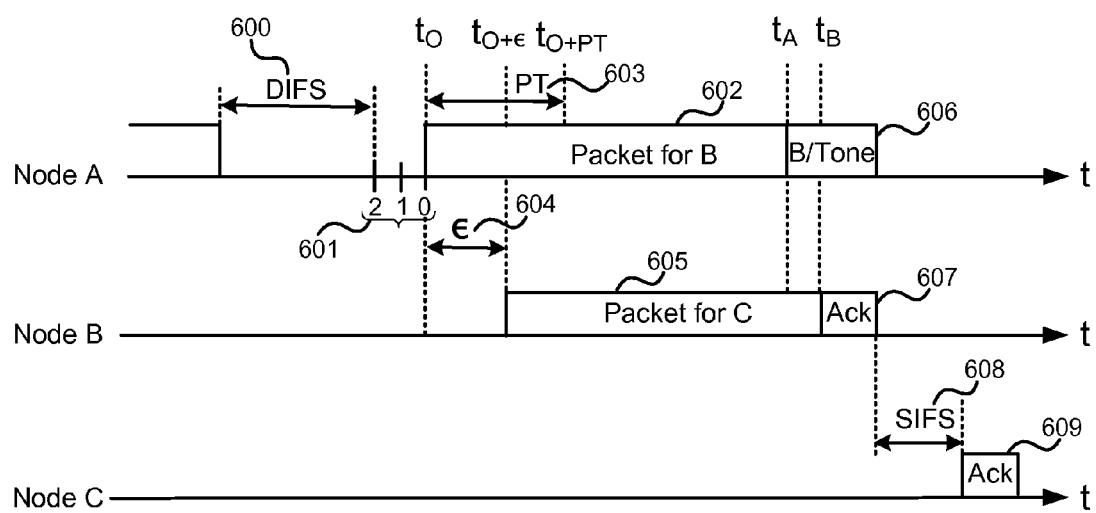
FIG. 6 illustrates a message sequence diagram in the case of a primary transmission ending before a secondary transmission.

Referring first to FIG. 6, the message sequence is shown for the case that the primary transmitter completes the transmission of its packet before the secondary transmission has finished sending its packet. As described above with reference to FIG. 3, before transmitting the primary transmitter (node A 100) waits for the DIFS interval 600 after the medium becomes idle, and then counts down its back-off counter 601. In this example, the random value of the back-off counter is two timeslots. Then, at time=t0 node A 100 begins transmitting a packet 602 to node B 102, and starts the primary timer 603.

Presuming that the start of the transmission of the packet 602 is successful (i.e. there is no collision), then the header of packet 602 is read by node B 102, and indicates that this is a primary transmission. This indicates to node B 102 that it should start transmitting. Node B 102 selects a packet to transmit, in this example this is a packet to node C 104. A delay of E 604 is introduced by reading the header and selecting a recipient and packet, and therefore the transmission of the packet 605 to node C 104 begins at time $t_{0+\epsilon}$.

At the expiry of the primary timer 603, time $t_{0+PT}$, node A 100 can sense the transmission from node B 102, and therefore determines that a collision has not occurred, and hence can keep transmitting the packet 602 to node B 102. Similarly, node B 102 continues with the transmission of the packet 605 to node C 104. At time $t_A$ node A 100 completes the transmission of the packet 602. However, at this time node B 102 is still transmitting the packet 605 to node C 104. In order to preserve the medium during this time, and ensure that another node does not attempt to transmit, node A 100 starts transmitting a busy tone 606.

At time $t_B$ node B 102 completes the transmission of the packet 605 to node C 104. Immediately following this, node B 102 sends an acknowledgement 607 to node A 100, to acknowledge receipt of packet 602. Node A 100 continues transmitting the busy tone 606 until the acknowledgement 607 has been received, in order to hold the medium and prevent other users from attempting to use it. Note that, in another example, the acknowledgements can be delayed so that a predetermined number of packets are sent and received between the primary transmitter and secondary receiver before the acknowledgement is sent.

After the sending of the acknowledgement, the medium becomes idle. Once the medium has been idle for a SIFS period 608, node C 104 sends an acknowledgement 609 to confirm the receipt of the packet 605 from node B 102. Note that the secondary transmission from node B 102 could, in other examples, be to the primary transmitter (i.e. packet 605 is for node A 100). In that case, only nodes A and B are involved in the message exchange. A secondary transmission back to the primary transmitter can occur frequently with certain types of data transmission. For example, if the primary transmitter is an access point, and the primary receiver is a node downloading internet content using the TCP protocol, then TCP acknowledgements are sent back to the access point. Also, voice over IP (VoIP) communication typically involves two-way communication comprising packets of a similar size.

FIG. 6 illustrates how the transmission by node B 102 concurrently with receiving the packet 602 from node A 100 solves the hidden node problem. Whilst node A 100 is transmitting to node B 102, no node within range of node B 102 (e.g. node C 104, D 106 or E 107 in FIG. 1) can start transmitting because node B 102 is transmitting at the same time, and thereby holding the medium. Similarly, by transmitting the busy tone 606 after the end of the packet 602, node A 100 ensures that no nodes are able to start transmitting in range of node A 100 until it has received the acknowledgement 607 from node B 102. This prevents collisions with the acknowledgement 607 and enables "atomic" acknowledgements to be sent. In other words no other nodes are able to transmit between the packet 602 and the acknowledgement 607.

Furthermore, FIG. 6 shows how the exposed terminal problem is mitigated by this technique. The exposed terminal problem prevents a node from transmitting a packet when it could be successfully sent. For example, in this instance, node C 104 could transmit to node F 108 whilst node A 100 and node B 102 are communicating, but the CSMA protocol prevents this. Therefore, the exposed node problem reduces the spatial reuse of the medium. The example in FIG. 6 shows that the reduction in spatial reuse caused by the exposed node problem is counteracted by the full-duplex transmissions of the nodes.

For example, given the example network in FIG. 1, in an ideal scenario two links could operate simultaneously—for example a first link between node B 102 and node A 100, and a second link between node C 104 and node F 108. The CSMA protocol precludes this, but the full-duplex transmission does enable two links to operate at the same time—between node A 100 and node B 102, and between node B 102 and node C 104. Therefore, the overall spatial reuse of the medium is maintained as the same as the ideal scenario, despite the shortcomings of CSMA.

The example in FIG. 6 further illustrates how the full-duplex technique with interference cancellation avoids overheads associated with methods such as CTS/RTS. There is no delay whilst a transmitter waits for a confirmation that it is able to transmit. In addition, the throughput is actually increased if the primary receiver has packets available to send, as these are sent in parallel with the primary transmission.

Figure 7:
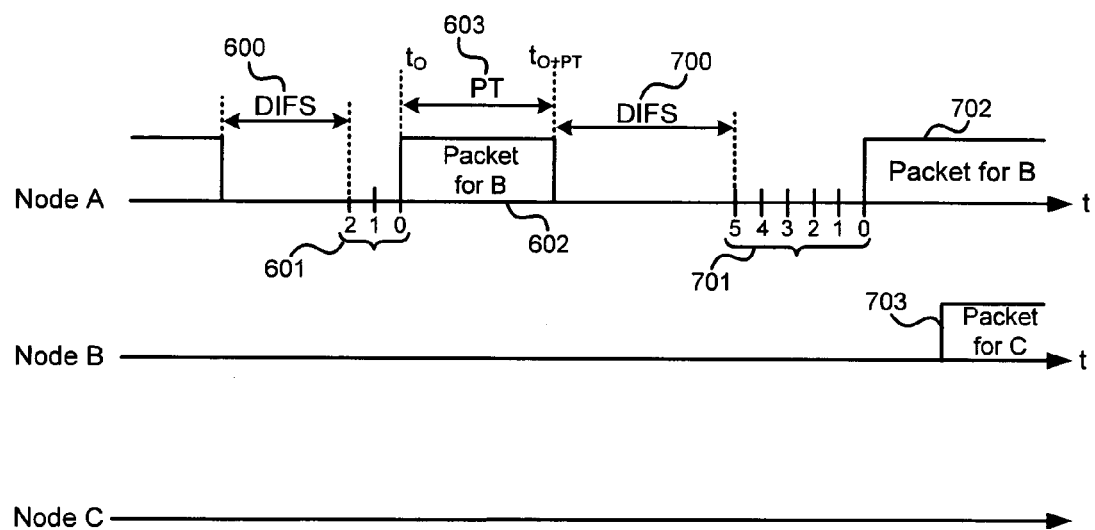
FIG. 7 illustrates a message sequence diagram in the case of a primary collision.

Reference is now made to FIG. 7, which illustrates the operation of the above-described flowcharts in the case that a collision occurs in the primary transmission. The start of the transmission process is the same as that outlined above with reference to FIG. 6, in that the primary transmitter (node A 100) waits for the DIFS interval 600 and the back-off counter 601, and starts transmitting the packet 602 to node B 102 at $t_0$. However, in this example, node B 102 does not successfully receive the packet 602, and cannot read the header. Because of this, node B 102 does not start transmitting. This can occur if, for example, another node within range of node B 102 happens to start transmitting at the same time as node A 100. At the end of the primary timer 603, i.e. time $t_{0+PT}$, node A 100 has not sensed the transmission from node B 102 and therefore ceases transmission of the packet 602.

Node A 100 then re-attempts the transmission process by waiting another DIFS interval 700, and counts down a new random back-off counter 701 (with the example count of five timeslots in FIG. 7). Re-transmission of a packet 702 to node B 102 is then attempted. In the example in FIG. 7, this is successful, with node B 102 responding with a packet 703.

The example shown in FIG. 7 shows that the primary transmitter (node A 100) is able to rapidly determine that a collision has occurred, without the use of any message passing, and immediately re-schedule the packet for re-transmission.

Figure 8:
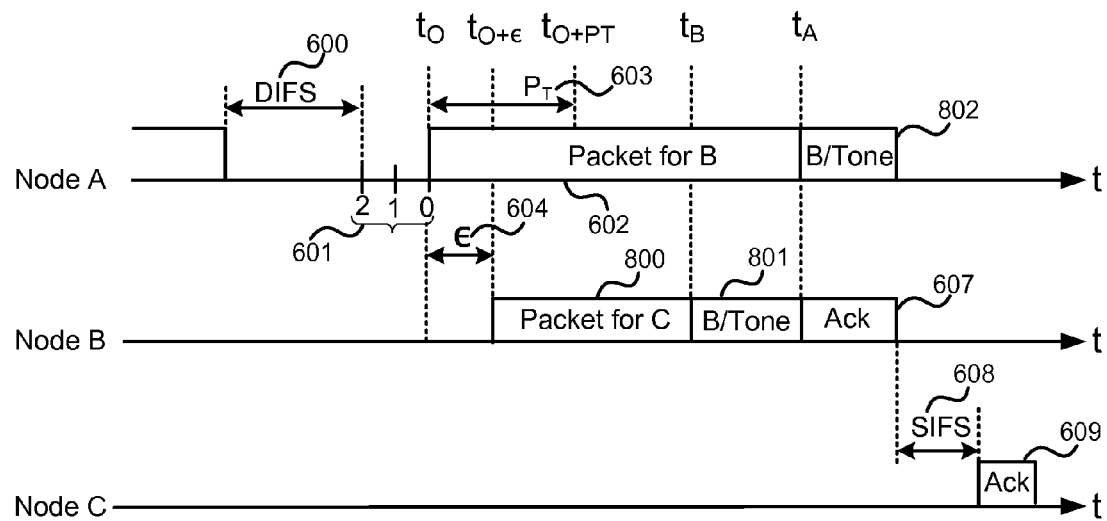
FIG. 8 illustrates a message sequence diagram in the case of a secondary transmission ending before a primary transmission.

Reference is now made to FIG. 8, which shows the message sequence for the case that the secondary transmitter completes the transmission of its packet before the primary transmission has finished sending its packet. The start of the transmission process is the same as that outlined above with reference to FIG. 6, in that the primary transmitter (node A 100) waits for the DIFS interval 600 and the back-off counter 601, and starts transmitting the packet 602 to node B 102 at $t_0$. In this case, the header of packet 602 is successfully read by node B 102, and a packet 800 is selected for transmission in response.

Node B 102 completes the transmission of the packet 800 at time $t_B$ before the primary transmission of the packet 602 from node A 100 is complete. Node B 102 continues transmission with a busy tone 801 until the primary transmission of the packet 602 from node A 100 is complete at $t_A$. At that point, node A 100 starts transmitting a busy tone 802, and node B sends the acknowledgement 607. As in FIG. 6 the medium becomes idle after the acknowledgement 607 is sent, and once the medium has been idle for a SIFS period 608, node C 104 sends an acknowledgement 609 to confirm the receipt of the packet 800 from node B 102.

The example in FIG. 8 shows that by sending the busy tone 801 after the completion of the transmission of packet 800, the medium is held while node B 102 finishes receiving the packet 602 from node A 100, and the hidden node problem is avoided.

As an alternative to transmitting a busy tone 801 until node B 102 finishes receiving the packet 602 from node A 100, another packet could be sent to a recipient. This recipient could be the same as that for the data packet 800, or a different node. This therefore involves sending more than one packet within a transmission frame. Multiple packets sent within a frame by the secondary transmitter (node B 102) can be delimited, for example by sending preamble sequences between them so that the (potentially different) receivers can decode the start of each sub-frame. Each separate secondary receiver receiving a sub-frame packet sends an acknowledgement back at a different time to avoid collisions. The time at which to send an acknowledgement can be a function of the position of the sub-frame in the secondary transmission.

Figure 9:
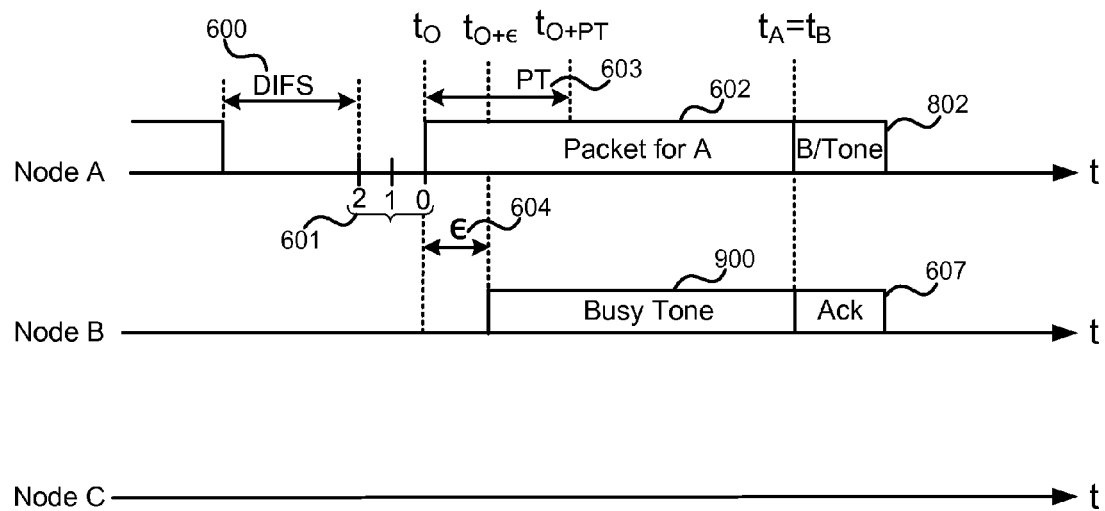
FIG. 9 illustrates a message sequence diagram in the case of no secondary transmission.

Reference is now made to FIG. 9, which shows the message sequence when the primary receiver does not have any packets available to transmit. As with FIG. 6 above, the primary transmitter (node A 100) waits for the DIFS interval 600 and the back-off counter 601, and starts transmitting the packet 602 to node B 102 at $t_0$. The header of packet 602 is successfully read by node B 102, but in this case the primary receiver (node B 102) does not have any packets available to send to any nodes within its range. In this instance, node B 102 transmits just a busy tone 900 instead of a packet. The busy tone 900 is transmitted until the primary transmission completes at $t_4$. At that point, node A 100 starts transmitting a busy tone 802, and node B 102 sends the acknowledgement 607. Following this, the medium becomes idle, and no further acknowledgements are expected, as only the busy tone 900 was transmitted by node B 102 (i.e. no secondary transmission).

The example of FIG. 9 illustrates that even if there are no packets available to be sent, the self-interference cancellation can be utilized by sending a busy tone that prevents other nodes from attempting to transmit data whilst node B 102 is receiving a packet. This therefore avoids the hidden node problem without introducing significant overheads or reducing throughput.

It should also be noted that the above-described technique also avoids the hidden node problem even if only one node has the full-duplex capability. For example, consider the case where node B 102 in FIG. 1 is an access point (AP) that has the full-duplex with self-interference cancellation functionality, and nodes A 100 and C 104 do not have the full-duplex with self-interference cancellation functionality. If node A 100 sends a packet to node B 102, then node B 102 starts transmitting either another packet or a busy tone, as described above. Node A 100 will simply keep transmitting its packet, and will not listen on the shared medium (as it does not have full-duplex capabilities). Therefore, the transmission from node B 102 will not affect node A 100. However, because node B 102 is transmitting, node C 104 will hear the transmission from node B 102, and not attempt to use the shared medium, thereby avoiding the hidden node problem. As node A 100 does not have the full-duplex capability, it cannot detect a primary collision until it is listening for the acknowledgement packet from node B 102, but otherwise, even with only one node having the full-duplex functionality, the hidden node problem is avoided without introducing significant overheads or reducing throughput.

Figure 10:
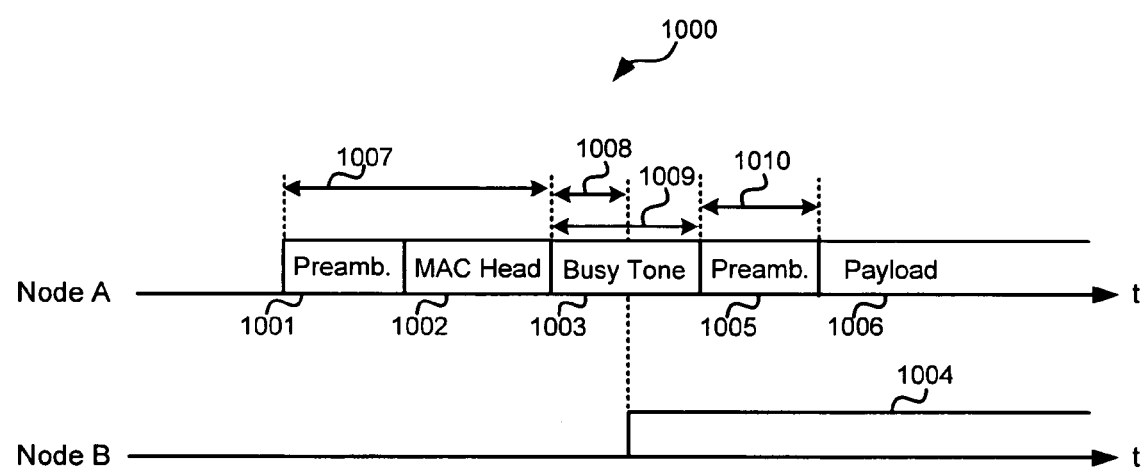
FIG. 10 illustrates an example packet layout.

FIG. 10 illustrates an example packet header 1000 included at the start of a packet sent by a primary transmitter. The packet header 1000 comprises a first preamble 1001 and a MAC header 1002. As stated, the primary receiver parses the MAC header 1002 to determine that this is a primary transmission, and start transmitting in response to this. In particular, the primary receiver selects a node to transmit a packet to and initiates the transmission. Because this takes a period of time to perform, the header comprises a busy tone 1003 after the MAC header 1002, to allow the primary receiver time to initiate transmission of a packet 1004. The busy tone 1003 is also long enough to give the primary receiver time to lock onto the phase of its own transmission, in order to enable the self-interference cancellation. A second preamble 1005 is then sent, which is a repeat of the first preamble 1001. This allows the primary receiver to lock onto the transmission after the self-interference cancellation is started. The data packet payload 1006 then follows. Note that the busy tone and the second preamble is not required in all implementations (e.g. if analog interference cancelation is used).

In an example, the duration 1007 of the first preamble 1001 and MAC header 1002 is approximately 300 μs, the primary receiver uses a duration 1008 of approximately 100-200 μs to start transmitting and approximately 50 μs for phase locking, the busy tone 1003 has a duration 1009 of approximately 250 μs, and the preamble has a duration 1010 of approximately 200 μs.

Figure 11:
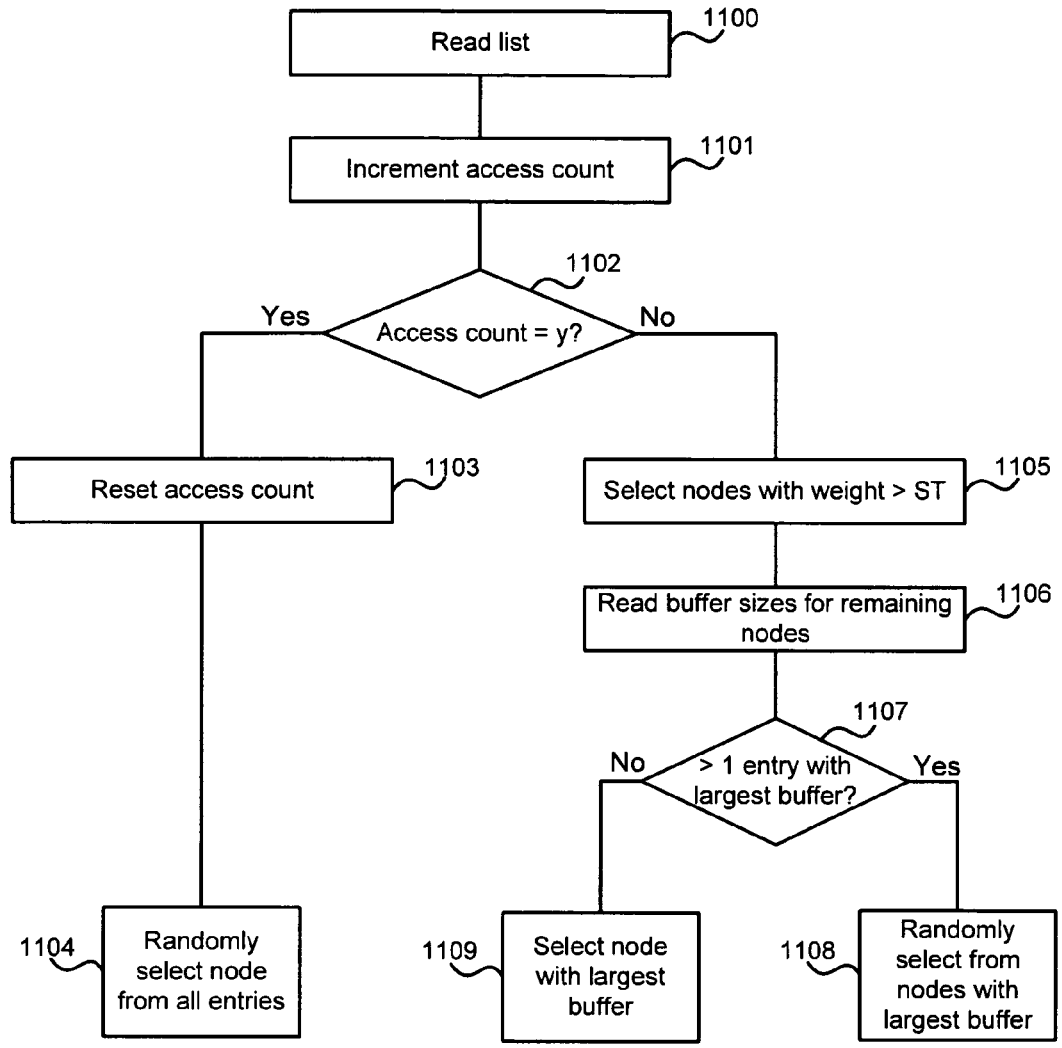
FIG. 11 is a flow diagram of a method for selecting a secondary receiver.

Reference is now made to FIG. 11, which illustrates a flowchart of a process performed by the secondary transmitter for selecting a node to be a secondary receiver. When a secondary transmitter selects a secondary receiver from its neighbors (as in 404 in FIG. 4), it has to account for the fact that the primary transmitter could interfere with the reception at a node selected. Therefore the objective for the secondary transmitter is to do this selection so that the collision rate for secondary transmissions is minimized. There are two causes of secondary transmission collisions. They can be due either to the interference structure of the network, i.e. the primary transmitter interferes at the secondary receiver, or due to the level of congestion of the network, i.e. a node in the neighborhood of the secondary receiver not sensing the activity of the primary sender and receiver and starting transmitting during the primary or secondary transmissions (i.e. the hidden node problem).

To deal with this issue, when a primary receiver (e.g. node B 102) receives a packet from a primary transmitter (e.g. node A 100), it selects the secondary receiver using a weighted list that each node maintains. The weight of each possible secondary receiver represents the proportion of successful secondary transmissions achieved in the past with the particular combination of links from the primary transmitter to the primary receiver/secondary transmitter. For example, node B 102, as a secondary transmitter, maintains a weighted list of possible secondary receivers for the case when node A 100 is the primary transmitter indicating the proportion of transmission attempts to each of those secondary receivers that were successful in the presence of the primary transmission from node A 100.

In one example, the weight can be computed on the basis of a predefined number of previous such transmissions. In another example, the weights can be maintained using an exponentially weighted moving average (EWMA) filter. The EWMA filter operates as follows. If node B 102 is transmitting a packet to node A 100 at time t, then a function $S_B[A, t]$ is defined such that it equals 1 if the transmission is successful and 0 otherwise. The weight for node A 100 at node B at time t+1 (denoted $W_B[A, t+1]$) is then updated as:

$$W_B[A,t+1]=a \times W_B[A,t]+(1-a) \times S_B[A,t]$$

Where 'a' has a value between 0 and 1, and $W_B[A, t]$ is updated whenever a transmission is attempted to node A. In one example, 'a' has a value of 0.99. By using an exponentially weighted moving average all previous transmissions to a node are taken into account, but more recent attempts to transmit a packet have a greater impact on the weight than older attempts.

By maintaining the weighted list, the interference structure of the network can be discovered. In the case where the network topology is fixed and where fading is not highly varying, the weighted lists do not evolve in time. In other cases, these lists adapt to the topology and fading changes.

An example of a weighted list is shown below for the network in FIG. 1, from the perspective of node B 102 as a secondary transmitter receiving a primary transmission from node A 100.

| Secondary Receiver | Weight |
|---|---|
| A | 1.0 |
| C | 0.9 |
| D | 0.0 |
| E | 0.8 |

In this example, node A 100 has a high weight of 1.0, as it cannot be interfered with, because node A 100 is the primary transmitter and can cancel its own interference. Node D 106 has a low weight of 0.0 as it is in range of the primary transmitter, and hence suffers interference. Node C 104 and E 107 both have high weights, as they are outside the range of the primary transmitter.

In addition to setting the weights according to the proportion of successful transmission attempts, a policy-based weight allocation can also be used in some examples, such that some nodes are preferred and have higher weights allocated to them.

The weighted list table can be used to select the secondary receiver with the flowchart shown in FIG. 11. The secondary receiver reads 1100 the weighted list and increments 1101 an access count parameter that is used to monitor the number of times the list is used. It is determined 1102 whether the access count has reached a given threshold Y. If the access count does equal Y, then the access count is reset 1103 to zero, and a node is randomly selected 1104 from all the entries in the weighted list, regardless of their weight. By doing this, it is ensured that the list evolves over time, as otherwise only those high weighted nodes would be selected, even though the low weighted nodes could have moved to a mode favorable location. The value of Y can be selected on the basis of how often the interference structure of the network is expected or observed to change.

If the access count has not reached Y, then a subset of nodes are selected 1105 that have a weight greater than a threshold ST. For each of the nodes in the subset, the length of the buffer of outgoing packets at the secondary transmitter is observed 1106. This is done to ensure that the node with the most data waiting to be sent is serviced first. If it is determined 1107 that there is more than one node sharing the largest buffer size, then a random selection 1108 is made between them to choose the secondary receiver. If only a single node has the largest buffer size, then this is chosen 1109 as the secondary receiver.

In another example, instead of using the flowchart of FIG. 11 to determine the secondary receiver, a weighted random selection can be made using the weighted list. In this case a secondary receiver is selected from the weighted list with a probability proportional to its weight. For example, the probability of selecting node C from the above weighted list is given by the weight for node C divided by the sum of all weights. For the example given above, this gives a probability of $0.9 \div (1.0+0.9+0.0+0.8)=0.33$.

Referring again to FIG. 3 and as stated above, the primary transmitter calculates a value for the back-off counter (block 303 in FIG. 3) and updates the back-off counter following a failed transmission (block 311 in FIG. 3). Several different algorithms can be used to achieve this.

In a first example, the procedure used in the DCF protocol can be performed. In this case, the contention window value (CW) for a node starts at a predefined minimum value ($CW_{min}$) and the value for the back-off counter is randomly selected uniformly from the range zero to $CW_{min}$. Following a collision, the size of the contention window is doubled, such that the first time a transmission is attempted after a collision, the back-off counter is randomly selected between zero and $2CW_{min}$. In other words, after y collisions, the contention window size is given by $CW=2^y CW_{min}$. After a successful transmission, the contention window size for the node is returned to $CW_{min}$. Therefore, as a result of increasing the contention window size, the probability of accessing the medium in a given timeslot is decreased. This is given by $P_n[t]=1/CW$, where $P_n[t]$ is the access probability for node n at time t.

By reducing the access probability the likelihood of a collision is consequently reduced. This is beneficial if the hidden node problem is present, as a node that experiences a collision due to a hidden node backs-off for a longer time before re-attempting transmission, thereby reducing the interference. However, such techniques do not enable all nodes to obtain the same amount of access to the medium, and hence are unfair.

Consider the nodes A 100, B 102 and C 104 in FIG. 1, where nodes A 100 and C 104 do not interfere with each other, but both interfere with and are interfered by node B 102. When node A 100 is active, node B 102 senses the medium busy and does not attempt to use it. However, node C 104 is free to start transmitting. As a result, node B 102 can see the medium busy for a very long period, corresponding to a succession of transmissions from node A 100 and C 104. Node B 102 observes an idle medium only when both links are inactive. Even now, because node B 102 competes with more nodes than nodes A 100 and C 104, it experiences a higher collision probability. As a result of being more prone to collisions, the access probability of node B 102 reduces (in accordance with the scheme above), which further reduces node B's likelihood of gaining access to the medium.

The issues with fairness of the above technique can be addressed by using an access protocol that increases the access probability when a node is not able to access the medium, rather than decreasing it. This is made feasible because the full-duplex MAC protocol described hereinabove removes the hidden node problem. If the hidden node problem were still present, then increasing the access probability when a node is not able to access the medium would mean that a node would be more likely to transmit at a given time after experiencing interference from a hidden node. This can ultimately result in two nodes that are hidden from each other both increasing their access probabilities until they are both transmitting all of the time and interfering constantly.

However, given that the hidden node problem is removed in the full-duplex scheme described above, increasing the access probability when a node cannot access the medium is achievable. This increases the fairness, because a node that has been unable to send data is more likely to gain access to the medium than a node that has been able to send data.

The fairness can be further increased by considering each individual link that can be established from a node, rather than just the node itself. For example, if one node has packets waiting to be sent to three recipients, and another node has packets waiting to be sent to only one recipient, then rather than sharing the access to the medium equally between the nodes the access can be shared equally between the links. In other words, it is fairer to give three quarters of the access time to the node having packets to be sent to three recipients, and one quarter of the access time to the node having packets to be sent to one recipient.

To achieve the increase in fairness, each node can maintain a parameter for each link which defines the "pressure" or "aggressivity" of that link. The parameter is updated by the node for each link at each time slot, such that the pressure or aggressivity increases when the link did not send data in the previous time slot. Note that these time-slots can be the same or longer than the CSMA time-slots. Therefore, the longer that a link does not send a packet, the more the pressure parameter increases. The pressure parameter can be made proportional to the access probability, such that the access probability increases as the pressure increases. As a result, the contention window decreases as the pressure increases.

An example algorithm for calculating the pressure parameter is shown below:

$$p_l[t+1] = p_l[t] + \alpha \cdot (I(p_l[t]) - D(p_l[t], S_l[t])) \quad (1)$$

$p_l[t]$ is the pressure indicator for link l, $\alpha$ is a constant having a small value, and $S_l[t]$ represents the service received on link l during time slot t. In one example, $\alpha$ has a value of 0.001 and $S_l[t]$ has a value of one if a link transmitted data in time slot t, and zero otherwise. $I(p_l[t])$ and $D(p_l[t], S_l[t])$ are positive functions such that the value of $p_l$ is upper bounded at $p_{max}$. In one example, these two function are defined as:

$$I(p_l[t]) = \frac{V \cdot p_l[t]}{\log p_l[t]} \quad (2)$$

$$D(p_l[t], S_l[t]) = p_l[t] \times S_l[t] \quad (3)$$

where V is a constant. An example value for V is 1.

The access probability can then be calculated by:

$$P_n[t] = \frac{\max\limits_{l \in O_n}(p_l[t])}{L} \quad (4)$$

where $O_n$ is the set of outgoing links from node n, and L is the packet duration in slots.

The value for the contention window can be calculated from the access probability as:

$$CW = \frac{1}{P_n[t]} \quad (5)$$

The back-off counter can then, for example, be calculated as a random variable in the range 1 to 2CW−1, such that the average of the random variable is CW.

In another example, the fairness can be further increased by utilizing an algorithm that accounts not only for the outgoing links that can be established by a node, but also the secondary links that could also be established as part of the full-duplex operation. For example, with reference to FIG. 1, if node A 100 is the primary transmitter, then it can calculate the access probability taking into account possible secondary transmissions that can occur, such as from node B 102 to node C 104. This is achieved through knowledge of the pressure indicators of the neighboring nodes. This ensures that a primary transmission which can result in a secondary transmission having data waiting to send is more likely to be established.

For example, the pressure indicators can be calculated as in equations (1) to (3) above. However, the assess probability can then be calculated as:

$$P_n[t] = \frac{1}{L} \times \left( \max_{l \in O_n}(p_l[t]) + \max_{m \in D_l}(weight_{l,m} - p_m[t]) \right) \quad (6)$$

Where $D_l$ is the set of secondary links that the can be established from the primary receiver node at the end of link l, $weight_{l,m}$ is the weight assigned to the secondary receiver reached by primary link l and secondary link m, for example as found from the weighted list described above.

If one of the fair random access protocols using the pressure indicator of equation (1) is used, then instead of using the flowchart of FIG. 11, the selection of the secondary receiver can be performed by selecting the node that maximizes the weight of the node multiplied by the pressure of the link to that node. For example, for node B 102 calculating this value for node C 104 a time t, this is given by the weight of C (0.9 in the table above)$\times p_i[t]$, where i is the link between B and C. This is calculated for each possible secondary receiver, and for example, the one having the largest value is selected.

Figure 12:
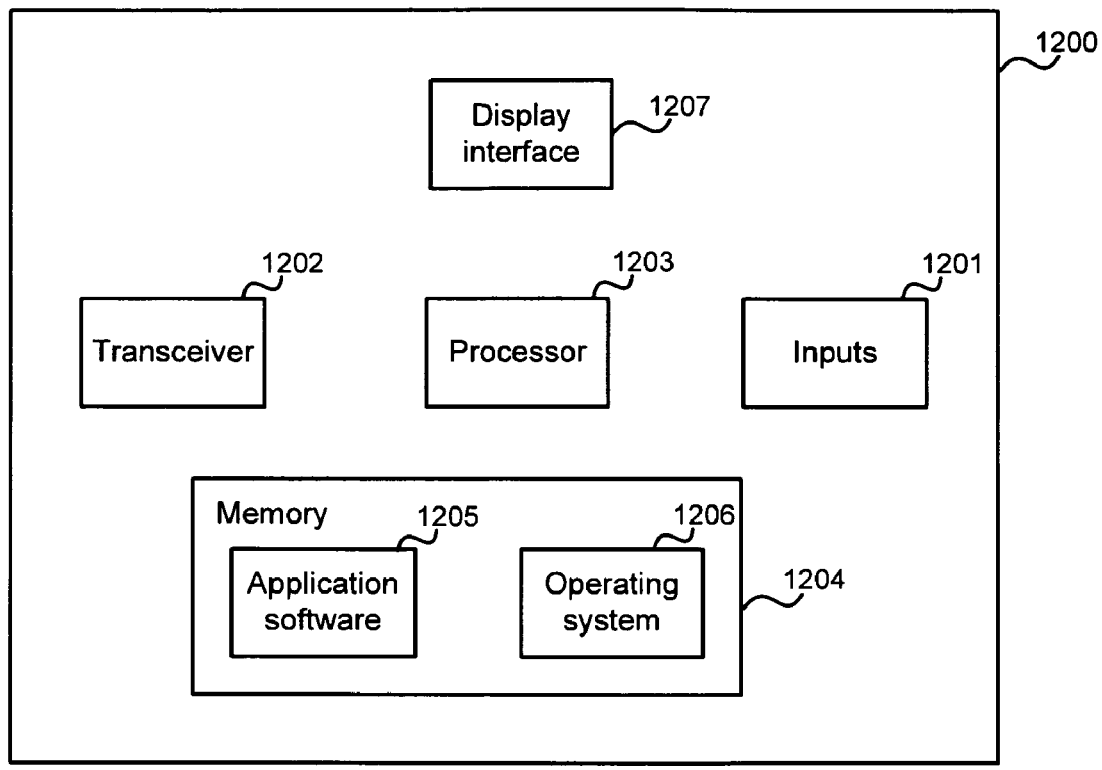
FIG. 12 illustrates an exemplary computing-based device in which embodiments of the full-duplex wireless communication may be implemented.

FIG. 12 illustrates various components of an exemplary computing-based device 1200 which may be implemented as any form of a computing and/or electronic device, and in which embodiments of a single band full-duplex communication system may be implemented.

The computing-based device 1200 comprises one or more inputs 1201 which are of any suitable type for receiving media content, Internet Protocol (IP) input, video streams, audio streams or other input. The device also comprises a transceiver 1202 to enable it to communicate with other devices using full-duplex communication with self-interference cancellation.

Computing-based device 1200 also comprises one or more processors 1203 which may be microprocessors, controllers or any other suitable type of processors for processing computing executable instructions to control the operation of the device in order to perform the full-duplex communication described herein. Platform software comprising an operating system 1206 or any other suitable platform software may be provided at the computing-based device to enable application software 1205 to be executed on the device.

The computer executable instructions may be provided using any computer-readable media, such as memory 1204. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output 1207 is also provided such as an audio and/or video output to a display system integral with or in communication with the computing-based device. The display system may provide a graphical user interface, or other user interface of any suitable type although this is not essential.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or substantially simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of accessing a shared communication medium with a transceiver device having a transmitter circuit and a receiver circuit, comprising:
   receiving a data packet header on the shared communication medium at the receiver circuit;
   responsive to receiving the data packet header determining if a further data packet is waiting to be sent, wherein:
   if a further data packet is not waiting to be sent then transmitting a busy tone, and
   if a further data packet is waiting to be sent then selecting a recipient for the further data packet and initiating transmission of an output signal comprising the further data packet from the transmitter circuit on the shared communication medium;
   concurrently with the transmission of the output signal from the transmitter circuit on the shared communication medium, receiving an impaired data signal at the receiver circuit on the shared communication medium, wherein the impaired data signal comprises a data packet payload and interference from the output signal;
   deriving a cancellation signal from the output signal;
   combining the cancellation signal with the impaired data signal to remove the output signal and recover the data packet payload; and
   determining if the data packet payload is still being received and in the case that the data packet payload is still being received, completing the transmission of the further data packet and then transmitting a predefined sequence of symbols, and in the case that the data packet payload has been fully received, transmitting an acknowledgement packet.

2. A method as claimed in claim 1, wherein the output signal comprises a predefined sequence of symbols.

3. A method as claimed in claim 1, wherein the output signal comprises an unmodulated carrier.

4. A method as claimed in claim 1, wherein the step of combining the cancellation signal with the impaired data signal comprises subtracting the cancellation signal from the impaired data signal.

5. A method as claimed in claim 1, wherein selecting a recipient for the further data packet comprises using a weighted list of possible recipients, the weighted list indicating the proportion of previous successful transmissions to each possible recipient.

6. A method as claimed in claim 1, wherein the step of deriving a cancellation signal comprises applying a time delay to the output signal.

7. A method as claimed in claim 1, wherein the shared communication medium is a radio channel.

8. A radio transceiver comprising:
   a receiver circuit;
   a transmitter circuit; and
   a processor connected to the receiver circuit and the transmitter circuit, wherein the processor is arranged to calculate a transmit window size, wherein the transmit window size is decreased when the transceiver was unable to transmit in a previous time period, initiate transmission of a data packet to a recipient from the transmitter circuit on a predetermined radio channel at a time instance within the transmit window, concurrently with the transmission of the data packet from the transmitter circuit on the predetermined radio channel, listen on the predetermined radio channel for a response originating from the recipient by deriving a cancellation signal from the transmitted data packet and combining the cancellation signal with a received signal at the receiver circuit to remove interference caused by the transmitted data packet and leave a residual signal, and determine whether the residual signal comprises the response originating from the recipient of the data packet and in the case that the residual signal does comprise the response originating from the recipient, completing the transmission of the data packet and then transmitting a predefined sequence of symbols until an acknowledgement packet is received from the recipient.

9. A radio transceiver according to claim 8, further comprising a receive antenna connected to the receiver circuit, and a transmit antenna connected to the transmit circuit.

10. A radio transceiver according to claim 8, wherein the radio transceiver is a carrier-sense multiple access radio transceiver.

11. A method of accessing a shared communication medium with a transceiver device having a transmitter circuit and a receiver circuit, comprising:

initiating transmission of a data packet to a recipient from the transmitter circuit on the shared communication medium;

concurrently with the transmission of the data packet from the transmitter circuit on the shared communication medium, listening on the shared communication medium for a response, originating from the recipient by deriving a cancellation signal from the transmitted data packet and combining the cancellation signal with a received signal at the receiver circuit to remove interference caused by the transmitted data packet and leave a residual signal; and determining whether the residual signal comprises the response originating from the recipient of the data packet and in the case that the residual signal does comprise the response originating from the recipient, completing the transmission of the data packet and then transmitting a predefined sequence of symbols until an acknowledgement packet is received from the recipient.

12. A method as claimed in claim 11, further comprising calculating a transmit window size, wherein the transmit window size is decreased when the transceiver was unable to transmit in a previous time period.

13. A method as claimed in claim 12, wherein the step of initiating transmission comprises initiating transmission of the data packet to the recipient from the transmitter circuit on the shared communication medium at a time instance within the transmit window.

14. A method as claimed in claim 13, wherein the time instance is randomly selected from within the transmit window.

15. A method as claimed in claim 11, wherein, in the case that the residual signal does not comprise the response originating from the recipient, ceasing the transmission of the data packet and scheduling a re-transmission of the data packet.

16. A method as claimed in claim 11, wherein the shared communication medium is a radio channel.

* * * * *